(12) United States Patent
Lim et al.

(10) Patent No.: US 11,774,645 B2
(45) Date of Patent: Oct. 3, 2023

(54) DIFFUSER HAVING ASYMMETRIC LIGHT OUTPUT PATTERN AND METHOD OF MANUFACTURING SAME

(71) Applicant: MEMSLUX, Daejeon (KR)

(72) Inventors: Keun-Seo Lim, Sejong-si (KR);
Gun-Wook Yoon, Gyeonggi-do (KR);
Shin-Ae Hwang, Daejeon (KR);
Seokyoon Yoon, Daejeon (KR)

(73) Assignee: MEMSLUX

( * ) Notice: Subject to any disclaimer, the term of this patent is extended or adjusted under 35 U.S.C. 154(b) by 553 days.

(21) Appl. No.: 16/887,861

(22) Filed: May 29, 2020

(65) Prior Publication Data

US 2021/0003750 A1    Jan. 7, 2021

(30) Foreign Application Priority Data

Jul. 1, 2019  (KR) .......................... 10-2019-0078788

(51) Int. Cl.
*G02B 5/02* (2006.01)
*G02B 3/00* (2006.01)
(Continued)

(52) U.S. Cl.
CPC ........ *G02B 5/0268* (2013.01); *B29D 11/0048* (2013.01); *B29D 11/00298* (2013.01);
(Continued)

(58) Field of Classification Search
CPC .......... B29D 11/00298; B29D 11/0048; B29D 11/00798; G02B 19/0014; G02B 19/0052;
(Continued)

(56) References Cited

U.S. PATENT DOCUMENTS 6,618,201 B2 * 9/2003 Nishikawa ........... G02B 3/0018
359/620
7,531,104 B1 * 5/2009 Hwu ........................ G03F 7/40
216/67
(Continued)

FOREIGN PATENT DOCUMENTS

CN      101292177      10/2008
CN      102520591      6/2012
(Continued)

OTHER PUBLICATIONS

Office Action issued in Korean Application No. 10-2019-0078788 dated Jul. 20, 2020.

*Primary Examiner* — Joseph P Martinez
*Assistant Examiner* — Vipin M Patel
(74) *Attorney, Agent, or Firm* — The Belles Group, P.C.

(57) ABSTRACT

The present invention relates to a diffuser and a method of manufacturing the same, and more particularly, to a diffuser and a method of manufacturing the same, in which light emitted through the diffuser forms an asymmetric light output pattern. A diffuser according to an exemplary embodiment is a diffuser that forms an asymmetric light output pattern by diffusing laser beams received from a laser source, the diffuser including: a base; and a micro lens array disposed on the base, in which the micro lens array has a plurality of micro lenses each comprising a lower surface and a curved surface disposed on the lower surface, and the lower surface has horizontal and vertical lengths different from each other.

14 Claims, 16 Drawing Sheets

(51) Int. Cl.
*G02B 3/02* (2006.01)
*B29D 11/00* (2006.01)
*G06V 40/16* (2022.01)

(52) U.S. Cl.
CPC ............ *G02B 3/0056* (2013.01); *G02B 3/02* (2013.01); *G02B 5/0278* (2013.01); *G06V 40/16* (2022.01)

(58) Field of Classification Search
CPC ............ G02B 27/0911; G02B 27/0916; G02B 3/0012; G02B 3/0056; G02B 3/02; G02B 5/0215; G02B 5/0257; G02B 5/0268; G02B 5/0278; G06V 40/16; G06V 40/166
See application file for complete search history.

(56) References Cited

U.S. PATENT DOCUMENTS 8,742,406 B1 * 6/2014 Leung ................. H01L 51/5275
257/40

2008/0316601 A1 * 12/2008 Hwang ................. G02B 3/0018
359/628
2015/0043067 A1 * 2/2015 Yun ........................ G02B 30/27
29/846

FOREIGN PATENT DOCUMENTS

| | | | | |
|---|---|---|---|---|
| CN | 103913784 | | 7/2014 | |
| CN | 104583668 | | 4/2015 | |
| CN | 105874358 A | * | 8/2016 | ......... G02B 27/0101 |
| CN | 106918978 | | 7/2017 | |
| CN | 208027074 | | 10/2018 | |
| CN | 110221509 | | 9/2019 | |
| CN | 111175861 | | 5/2020 | |
| JP | 2014-139656 | | 7/2014 | |
| JP | 2014139656 | | 7/2014 | |
| KR | 10-0797778 | | 1/2008 | |
| KR | 10-2008-0054397 | | 6/2008 | |
| KR | 10-2013-0053937 | | 5/2013 | |
| KR | 10-2014-0047412 | | 4/2014 | |
| WO | WO2017188225 A1 | | 11/2017 | |
| WO | 2017188225 | | 3/2019 | |

\* cited by examiner

FIG. 2
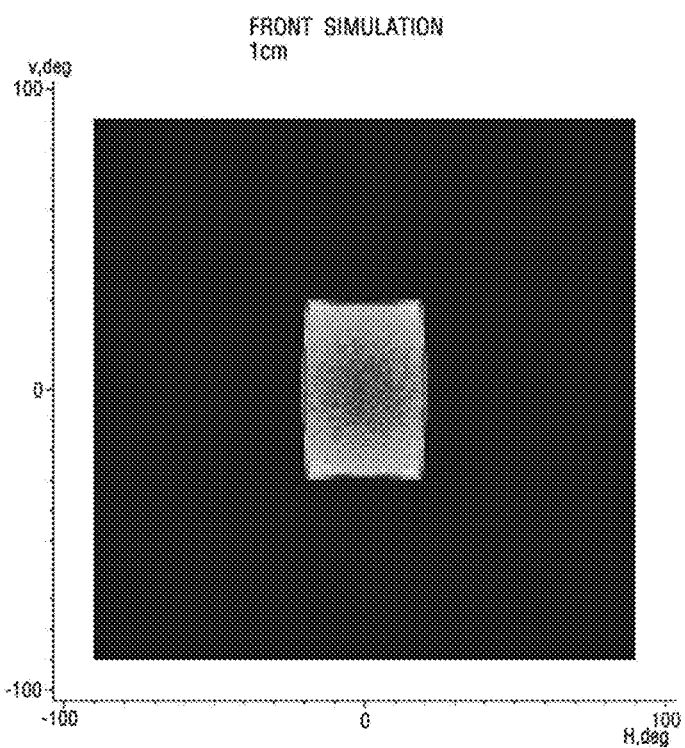
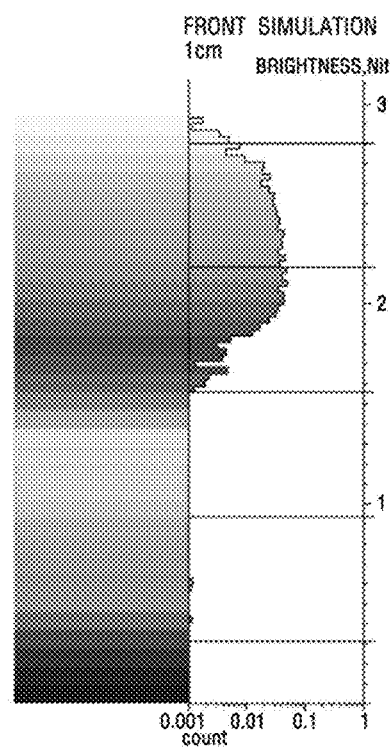

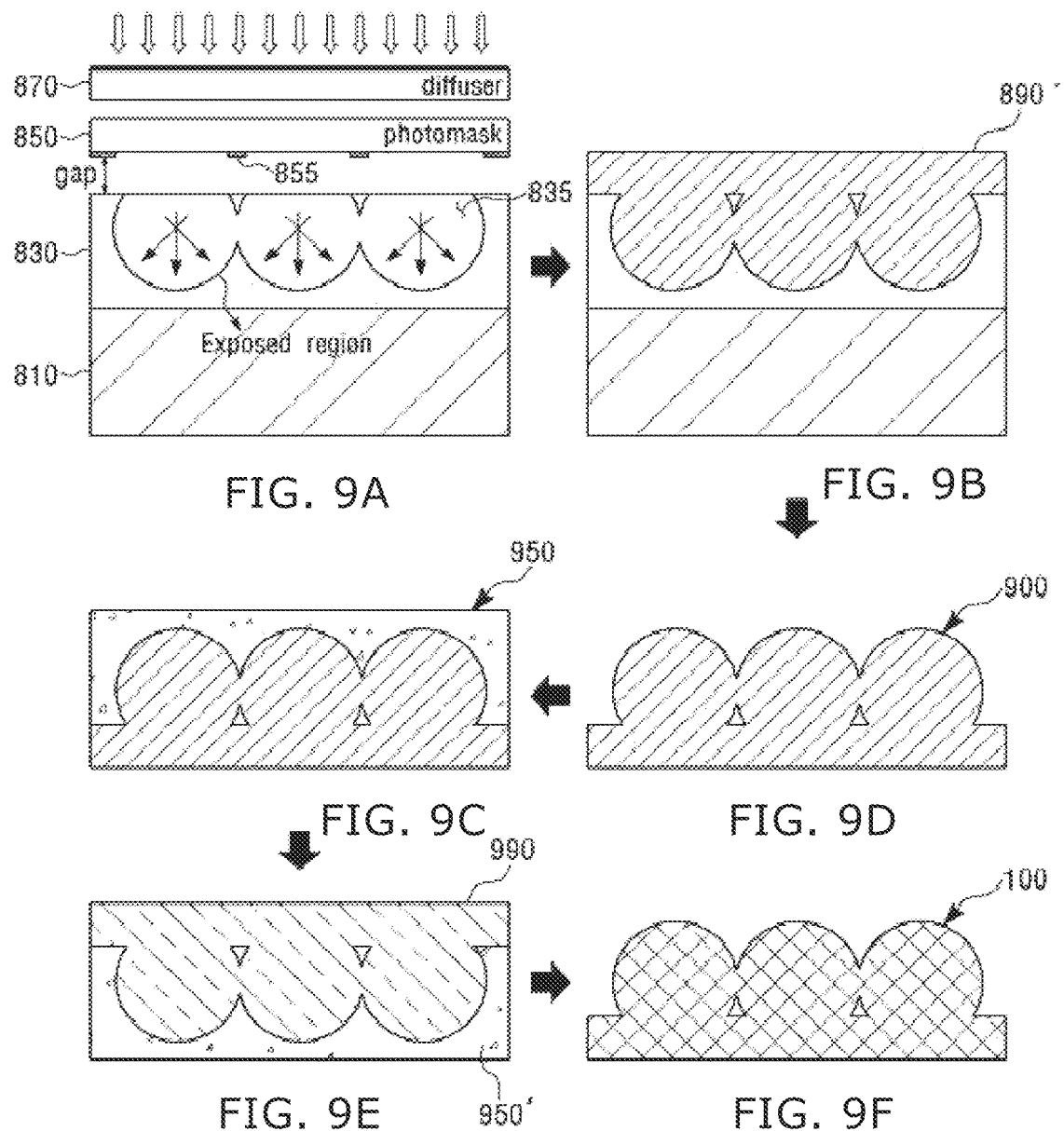

DIFFUSER HAVING ASYMMETRIC LIGHT OUTPUT PATTERN AND METHOD OF MANUFACTURING SAME

CROSS-REFERENCE TO RELATED APPLICATIONS

This application claims priority to and the benefit of Korean Patent Application No. 10-2019-0078788 filed in the Korean Intellectual Property Office on Jul. 1, 2019, the entire contents of which are incorporated herein by reference.

TECHNICAL FIELD

The present invention relates to a diffuser and a method of manufacturing the same, and more particularly, to a diffuser and a method of manufacturing the same, in which light emitted through the diffuser forms an asymmetric light output pattern.

BACKGROUND ART

Biometrics refers to a method of verifying identities of individuals by extracting biometric information (face, voice, fingerprint, hand vein, iris, DNA, etc.) different for each person. The biometrics may have the advantages of security and convenience.

The biometrics may satisfy not only excellent security that may specify only individuals using human biometric information, but also convenience because there is no need to carry a separate device or memorize information.

Regarding the biometrics, a lot of research has been conducted particularly on face recognition in addition to fingerprint recognition. A face recognition process may be broadly classified into a face detection technology and a face recognition technology through feature extraction and matching. Once an image to be recognized is acquired, a process of separating only a face region to be recognized from the image is performed.

In this process, in order to construct a face recognition system having a high recognition rate, the face region needs to be accurately extracted. Therefore, it can be said that the face detection technology is an important technology that dominates a performance of the system.

Recently, with the trend of miniaturization of face image acquisition devices including smartphones, lasers are used to acquire face images simply and economically. In order to accurately recognize a user's face using a smartphone, the entire face of the user needs to be scanned by emitted laser beams. Because the user's face is generally and relatively longer in a vertical direction than in a horizontal direction, there is a need for a diffuser having an asymmetric light output pattern in order to accurately recognize the entire face of the user.

SUMMARY OF THE INVENTION

The present invention has been made in an effort to provide a diffuser capable of emitting laser beams having an asymmetric light output pattern by receiving predetermined laser beams.

The present invention has also been made in an effort to provide a method of manufacturing the diffuser, the method being capable of increasing a yield of the diffuser and reducing manufacturing costs.

A diffuser according to an exemplary embodiment is a diffuser that forms an asymmetric light output pattern by diffusing laser beams received from a laser source, the diffuser including: a base; and a micro lens array disposed on the base, in which the micro lens array has a plurality of micro lenses each comprising a lower surface and a curved surface disposed on the lower surface, and the lower surface has horizontal and vertical lengths different from each other.

A diffuser according to another exemplary embodiment is a diffuser that forms an asymmetric light output pattern by diffusing laser beams received from a laser source, the diffuser including: a base; and a micro lens array disposed on the base, in which the micro lens array has a plurality of micro lenses each comprising a lower surface and a curved surface disposed on the lower surface, and the lower surface has horizontal and vertical lengths equal to each other.

A method of manufacturing a diffuser according to still another exemplary embodiment is a method of manufacturing a diffuser that forms an asymmetric light output pattern by diffusing laser beams received from a laser source, the method including: a photoresist layer forming step of forming a photoresist layer on a substrate; a mask forming step of forming a mask having a predetermined mask pattern on the photoresist layer; a void forming step of forming a plurality of voids, which corresponds to the mask pattern, in the photoresist layer by irradiating the mask with the diffused light having horizontal and vertical beam angles equal to each other; and a diffuser forming step of forming the diffuser by forming a diffuser forming material in the plurality of voids, in which in the mask pattern formed on the mask, a distance between the adjacent two patterns arranged in the horizontal direction is different from a distance between the adjacent two patterns arranged in the vertical direction.

A method of manufacturing a diffuser according to yet another exemplary embodiment is a method of manufacturing a diffuser that forms an asymmetric light output pattern by diffusing laser beams received from a laser source, the method including: a photoresist layer forming step of forming a photoresist layer on a substrate; a mask forming step of forming a mask having a predetermined mask pattern on the photoresist layer; a void forming step of forming a plurality of voids, which corresponds to the mask pattern, in the photoresist layer by irradiating the mask with the diffused light having horizontal and vertical beam angles different from each other; and a diffuser forming step of forming the diffuser by forming a diffuser forming material in the plurality of voids, in which in the mask pattern formed on the mask, a distance between the adjacent two patterns arranged in the horizontal direction is equal to a distance between the adjacent two patterns arranged in the vertical direction.

With the use of the diffuser according to the exemplary embodiments of the present invention, it is possible to emit the laser beams having an asymmetric light output pattern by receiving the predetermined laser beams.

With the method of manufacturing the diffuser according to the exemplary embodiments of the present invention, it is possible to increase a yield of the diffuser and reduce manufacturing costs.

BRIEF DESCRIPTION OF THE DRAWINGS

FIG. 2 is a brightness graph illustrating a light output pattern made by laser beams DL emitted from the diffuser 100 illustrated in FIG. 1A.

FIGS. 9A to 9F are views for explaining another method of manufacturing the diffuser 100 illustrated in FIG. 1A.

DETAILED DESCRIPTION

Figure 1A:
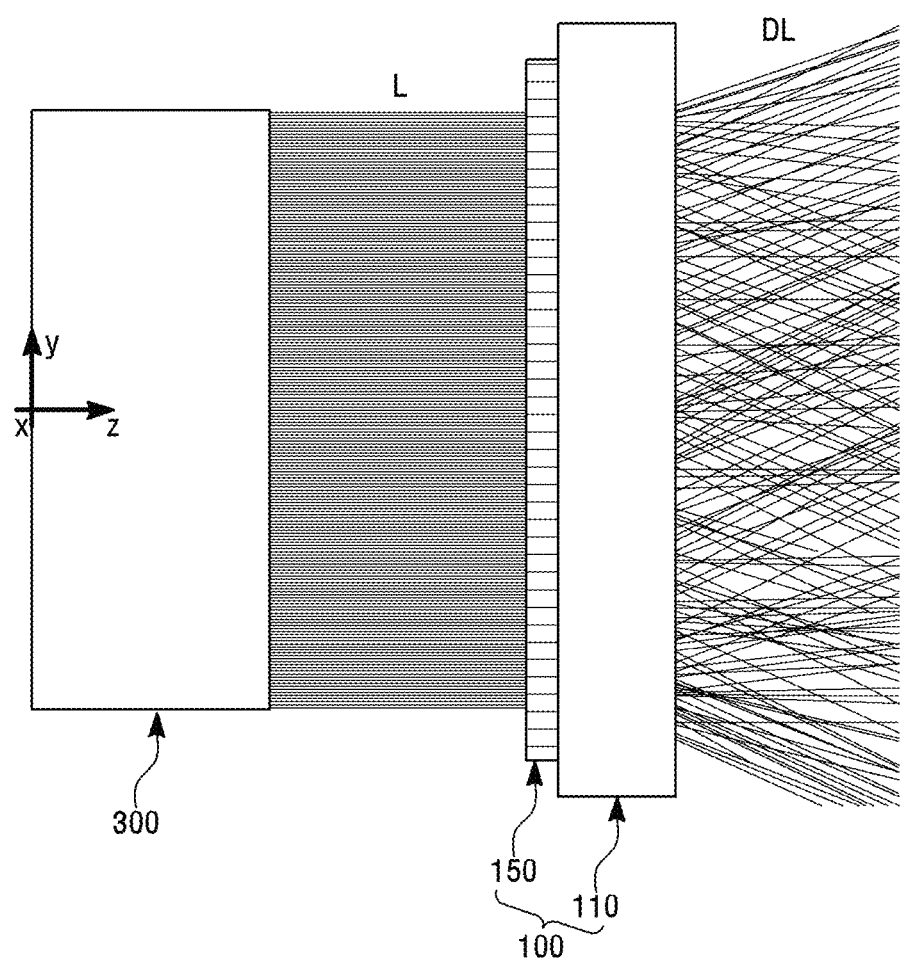
FIG. 1A is a view for explaining a laser diffusing system according to an exemplary embodiment of the present invention.

The following detailed description of the present invention will be made with reference to the accompanying drawings illustrating specific exemplary embodiments for carrying out the present invention. These exemplary embodiments will be described in detail enough to carry out the present invention by those skilled in the art. It should be understood that various exemplary embodiments of the present invention are different from one another but need not be mutually exclusive. For example, particular shapes, structures, and characteristics described herein in respect to one exemplary embodiment may be implemented in other exemplary embodiments without departing from the spirit and scope of the present invention. In addition, it should be understood that the position or arrangement of each constituent element in the respective disclosed exemplary embodiments may be changed without departing from the spirit and scope of the present invention. Therefore, the following detailed description is not considered as having limited meanings, and the scope of the present invention, if adequately explained, is limited only by the appended claims as well as all the scopes equivalent to the features claimed in the appended claims. Like reference numerals in the drawings refer to the same or similar function throughout several aspects.

FIG. 1A is a view for explaining a laser diffusing system according to an exemplary embodiment of the present invention.

Referring to FIG. 1A, the laser diffusing system according to the exemplary embodiment of the present invention includes a diffuser 100 and a laser source 300.

The laser source 300 emits predetermined laser beams L. The laser source 300 provides the laser beams L to the diffuser 100.

The laser source 300 may include a vertical-cavity surface-emitting laser (VCSEL). The VCSEL is a kind of semiconductor laser diode that emits laser beams in a direction perpendicular to an upper surface thereof. In this case, the laser source 300 is not limited to the VCSEL, and the laser source 300 may include a general laser.

The diffuser 100 forms an asymmetric light output pattern by diffusing the laser beams L received from the laser source 300. That is, the diffuser 100 receives the laser beams L from the laser source 300, diffuses the received laser beams L, and emits the diffused laser beams DL. Further, the diffused laser beams DL have the asymmetric light output pattern. The asymmetric light output pattern will be described in detail with reference to FIGS. 2 to 3.

Figures 3A, 3B:
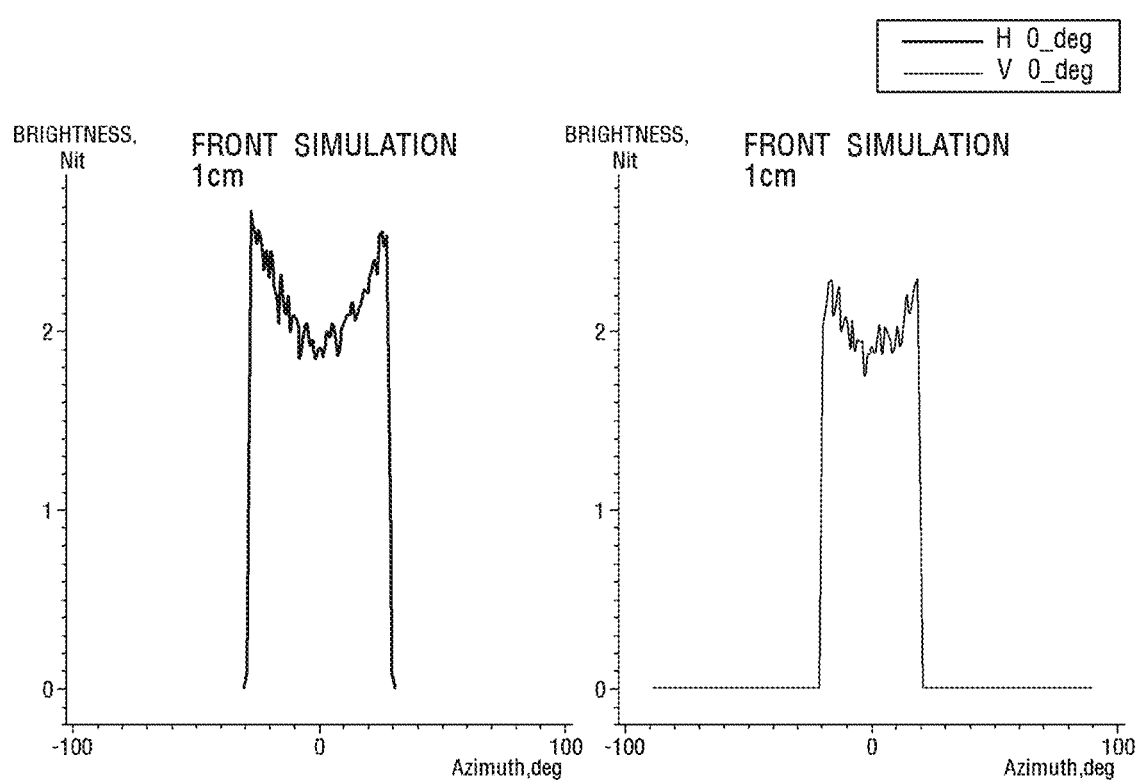
FIG. 3A is a brightness value graph in a vertical direction (or first direction) of the brightness graph illustrated in FIG. 2.
FIG. 3B is a brightness value graph in a horizontal direction (or second direction) of the brightness graph illustrated in FIG. 2.

FIG. 2 is a brightness graph illustrating the light output pattern made by the laser beams DL emitted from the diffuser 100 illustrated in FIG. 1A, FIG. 3A is a brightness value graph in a vertical direction (or first direction) of the brightness graph illustrated in FIG. 2, and FIG. 3B is a brightness value graph in a horizontal direction (or second direction) of the brightness graph illustrated in FIG. 2.

Referring to FIG. 2, the light output pattern of the laser beams DL emitted from the diffuser 100 has an asymmetric light output pattern. In this case, the asymmetric light output pattern means that a horizontal width and a vertical width of a light output pattern formed on an irradiation surface are different from each other. Therefore, it can be seen that the asymmetric light output pattern has a rectangular light output pattern.

Referring to FIGS. 3A and 3B, it can be ascertained that a pattern width and a brightness value in the vertical direction (or first direction) are somewhat larger than a pattern width and a brightness value in the horizontal direction (or second direction).

Referring back to FIG. 1A, the diffuser 100 includes a base 110 and a micro lens array 150 disposed on the base 110.

The base 110 serves to support the micro lens array 150. The base 110 may be made of the same material as the micro lens array 150. The base 110 may transmit the laser beams DL emitted from the micro lens array 150.

Figure 1B:
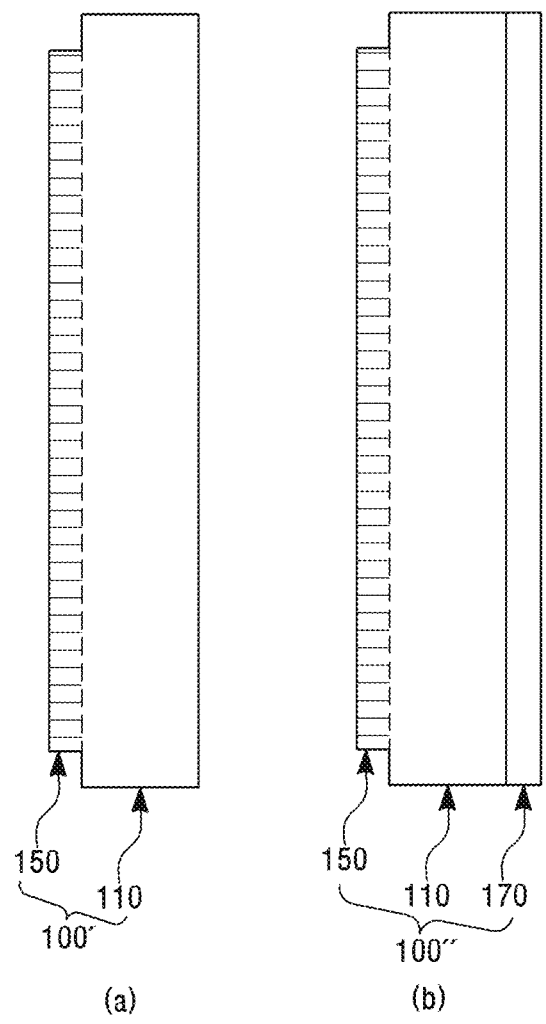
FIG. 1B is a view for explaining modified examples of a diffuser 100 illustrated in FIG. 1A.

In this case, as illustrated in (a) of FIG. 1B, the base 110 and the micro lens array 150 may be made of the same material and formed integrally, thereby constituting a diffuser 100' according to a modified exemplary embodiment. Meanwhile, the base 110 and the micro lens array 150 may be made of different materials, and the base 110 and the micro lens array 150, which are made of different materials, may be attached and coupled to each other.

In this case, as illustrated in (b) of FIG. 1B, a diffuser 100" according to another modified exemplary embodiment may include the base 110, the micro lens array 150 disposed on the base 110, and an additional base 170 disposed under the base 110. The additional base 170 and the base 110 may be made of the same material or different materials. The additional base 170 may protect the diffuser 100" from external foreign substances and prevent breakage of or damage to the diffuser 100".

Referring back to FIGS. 1A and 1B, the micro lens array 150 may be disposed on one surface of the base 110, particularly, one of the two surfaces of the base 110 which is directed toward the laser source 300.

Hereinafter, the micro lens array 150 will be described in detail with reference to FIGS. 4 to 6.

Figure 4:
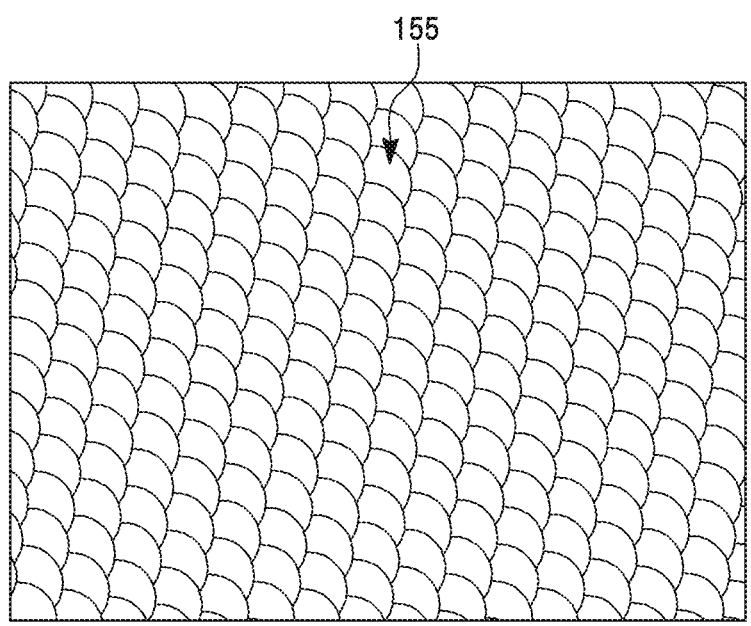
FIG. 4 is a perspective view illustrating a part of a micro lens array 150 of the diffuser 100 illustrated in FIG. 1A.
Figure 5:
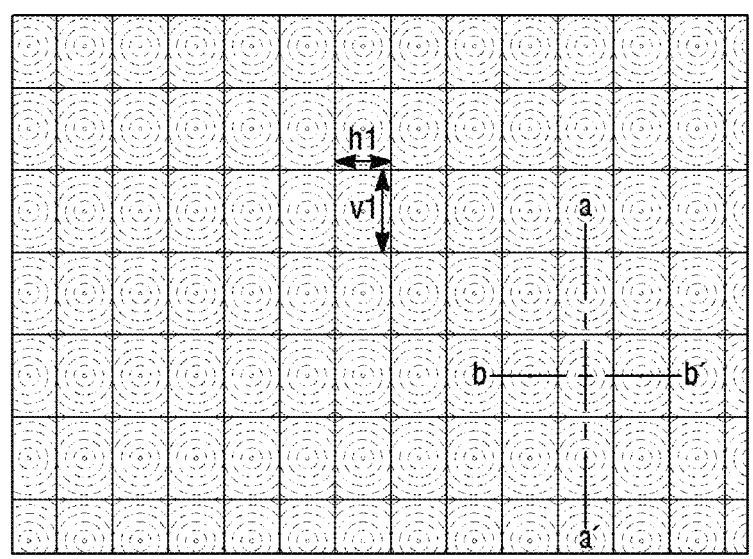
FIG. 5 is a front view illustrating a part of the micro lens array 150 of the diffuser 100 illustrated in FIG. 1A.
Figure 6A:
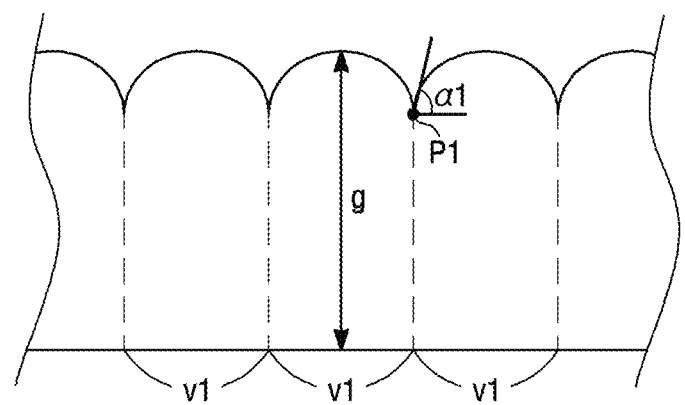
FIG. 6A is a cross-sectional view taken along line a-a' illustrated in FIG. 5.
Figure 6B:
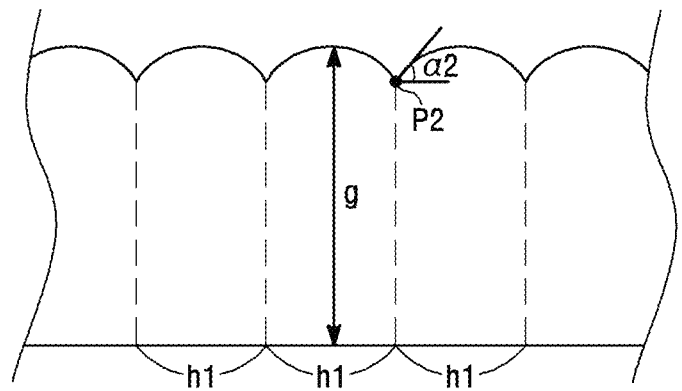
FIG. 6B is a cross-sectional view taken along line b-b' illustrated in FIG. 5.

FIG. 4 is a perspective view illustrating a part of the micro lens array 150 of the diffuser 100 illustrated in FIG. 1A, FIG. 5 is a front view illustrating a part of the micro lens array 150 of the diffuser 100 illustrated in FIG. 1A, FIG. 6A is a cross-sectional view taken along line a-a' illustrated in FIG. 5, and FIG. 6B is a cross-sectional view taken along line b-b' illustrated in FIG. 5.

Referring to FIGS. 4 to 6, the micro lens array 150 may be configured by a plurality of micro lenses 155 disposed adjacent to one another in the vertical direction (or first direction) and the horizontal direction (or second direction). The plurality of micro lenses 155 may be disposed regularly instead of being disposed randomly.

Each of the micro lenses 155 is a micro lens including a lower surface and a curved surface disposed on the lower surface, and the lower surface has a horizontal length hl and a vertical length vl which are different from each other. FIGS. 5 and 6 illustrate that the vertical length vl is larger than the horizontal length hl, but the opposite case is possible.

As illustrated in FIG. 5, the curved surface of the micro lens 155 may be a spherical surface. More specifically, a curvature of the curved surface of the micro lens 155, which is made by cutting the micro lens 155 in the vertical direction (along the line a-a') as illustrated in FIG. 6A, is equal to a curvature of the curved surface of the micro lens 155 which is made by cutting the micro lens 155 in the horizontal direction (along the line b-b') as illustrated in FIG. 6B. Therefore, the micro lens 155 is isotropic. Meanwhile, although not illustrated in the drawings, the curved surface of the micro lens 155 may be aspherical.

The plurality of micro lenses 155 is disposed adjacent to one another in the horizontal direction and the vertical direction, and the lower surface of each of the plurality of micro lenses 155 has horizontal and vertical lengths different from each other. Therefore, as illustrated in FIGS. 6A and 6B, in the plurality of micro lenses 155, a gradient $\alpha 1$ of a tangential line at a connection point P1 between the two micro lenses disposed adjacent to each other in the vertical direction is different from a gradient $\alpha 2$ of a tangential line at a connection point P2 between the two micro lenses disposed adjacent to each other in the vertical direction. In more detail, $\alpha 1$ is larger than $\alpha 2$. Meanwhile, in FIGS. 6A and 6B, $\alpha 1$ and $\alpha 2$ may be defined as gradients of the respective tangential lines based on the lower surface of the micro lens 155.

Figure 7A:
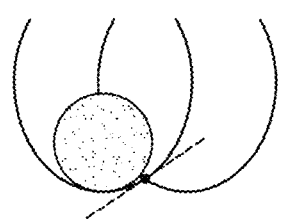
FIGS. 7A to 7D are views for explaining spread of laser beams in accordance with a gradient of a tangential line.
Figure 7B:
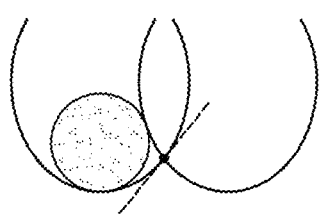
Figure 7C:
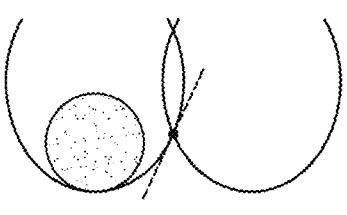
Figure 7D:
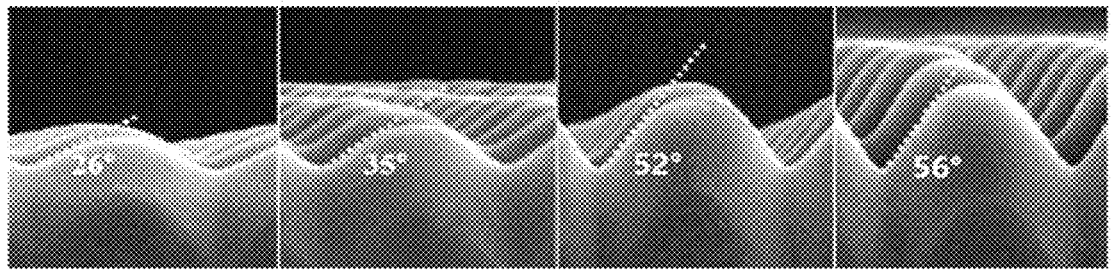

The spread of the laser beams diffused by the micro lenses 155 is determined based on the different $\alpha 1$ and $\alpha 2$. Specifically, referring to FIGS. 7A to 7C, the spread of the laser beams is larger as the gradient of the tangential line is relatively steeper (or larger), and the spread of the laser beams is smaller as the gradient of the tangential line is relatively gentler (or smaller). That is, a beam angle or a radiation angle varies depending on an angle of inclination of the curved surface of the micro lens 155. For reference, FIG. 7D shows photographs of the micro lenses actually manufactured to have various tangential lines having gradients (26°, 35°, 52°, and 56°).

As illustrated in FIGS. 6A and 6B, because $\alpha 1$ is relatively larger than $\alpha 2$, the laser beams are spread further in the vertical direction than in the horizontal direction. Therefore, as illustrated in FIGS. 2 and 3, the micro lens array 150 having the plurality of micro lenses 155 may emit the laser beams DL in the asymmetric light output pattern.

Figures 8A, 8B:
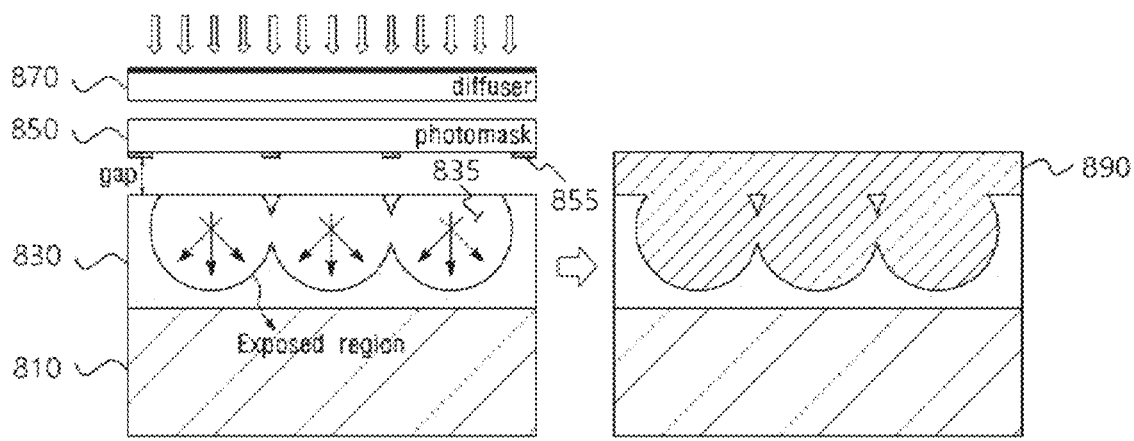
FIGS. 8A to 8C are views for explaining a method of manufacturing the diffuser 100 illustrated in FIG. 1A.
Figure 8C:
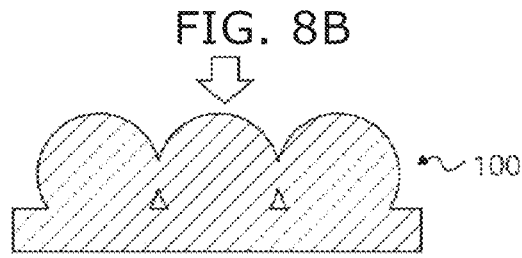

FIGS. 8A to 8C are views for explaining a method of manufacturing the diffuser 100, 100', or 100" illustrated in FIG. 1A or 1B.

Referring to FIG. 8A, a photoresist layer 830 is formed on a substrate 810 (photoresist layer forming step), and a mask 850 having a mask pattern 855 is formed on the photoresist layer 830 (mask forming step). Further, the mask 855 is irradiated with predetermined light such as ultraviolet (UV) rays, such that a plurality of voids 835 corresponding to the mask pattern 855 is formed in the photoresist layer 830 (void forming step).

In this case, the light emitted to the mask 855 may have a horizontal beam angle and a vertical beam angle which are equal to each other.

A shape of the plurality of voids 835 may be adjusted based on one or more of an exposure dose of ultraviolet rays, a gap between the mask 855 and the photoresist layer 830 (or between the mask pattern 855 and the photoresist layer 830), and an opening width of the pattern array 855.

A diffusing plate 870 (or a diffuser) may be disposed on the mask 850, and then the diffused light may be emitted to the mask 850. The diffusing plate 870 emits the diffused light having the horizontal beam angle and the vertical beam angle which are equal to each other. In this case, the shape of the plurality of voids 835 may be additionally adjusted based on types of diffusing plates 870.

Referring to FIG. 8B, the diffuser 100 may be formed by forming a diffuser forming material 890 on the photoresist layer 830 having the plurality of voids 835, curing the diffuser forming material 890, and then separating the cured diffuser forming material 890 from the photoresist layer 830, as illustrated in FIG. 8C (diffuser forming step).

FIGS. 9A to 9F are views for explaining another method of manufacturing the diffuser 100, 100', or 100" illustrated in FIG. 1A or 1B.

FIGS. 9A and 9B are identical to FIGS. 8A and 8B. However, there is a difference in that a material formed on the photoresist layer 830 is a first mold forming material 890' as illustrated in FIG. 9B. In this case, the first mold forming material 890' may be a hard material such as metal.

Next, as illustrated in FIG. 9C, a first mold 900 may be obtained by separating the cured first mold forming material 890' from the photoresist layer 830.

Next, referring to FIG. 9D, a second mold forming material 990 is formed on the first mold 900. In this case, the second mold forming material 990 is different from the first mold forming material 890'. The second mold forming material 990 may be a material softer than the first mold forming material 890'. For example, the second mold forming material 990 may be an elastic material, particularly, PDMS. A second mold 950' may be obtained by curing the second mold forming material 990 and then separating the cured second mold forming material 990 from the first mold 900.

Next, referring to FIG. 9E, the diffuser forming material 990 is formed on the second mold 950' and then cured. Then, as illustrated in FIG. 9F, the diffuser 100, 100', or 100" illustrated in FIG. 1A or 1B may be formed by separating the cured diffuser forming material 990 from the second mold 950'.

According to the methods of manufacturing the diffuser 100 illustrated in FIGS. 8 and 9, the mask 850 having the mask pattern 855 is used to manufacture the isotropic micro lenses 155 illustrated in FIGS. 4 to 6. Hereinafter, the shape of the mask pattern 855 formed on the mask 850 will be described with reference to FIG. 10.

Figure 10:
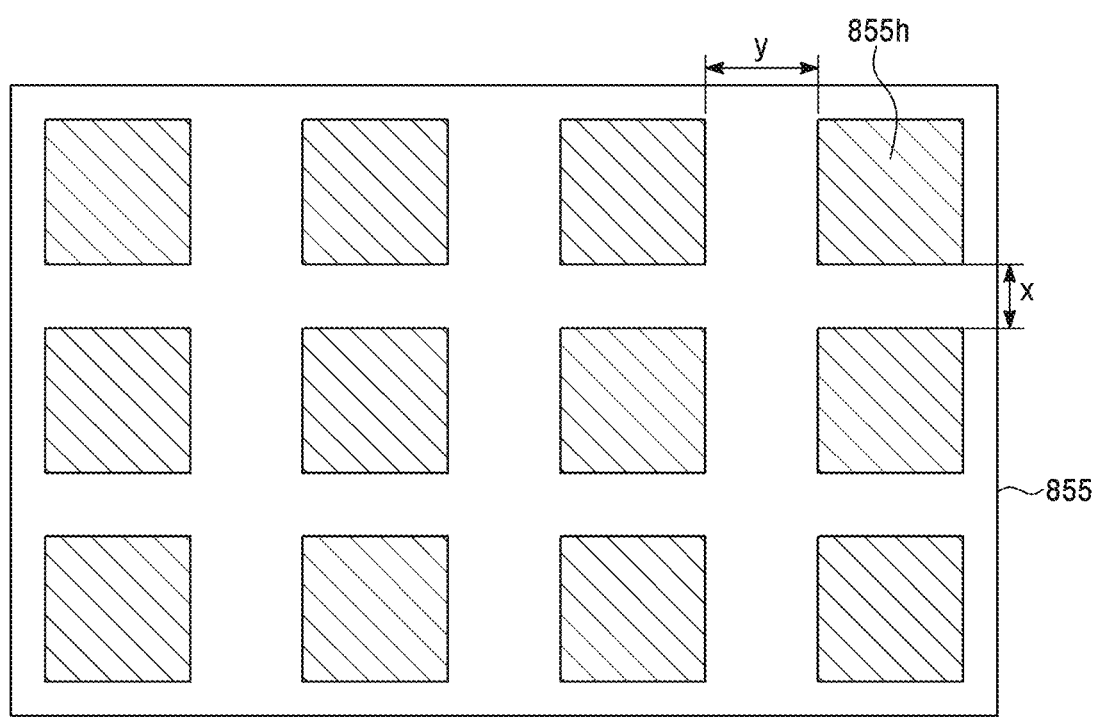
FIG. 10 is a view for explaining a structure of a mask pattern 855 formed on a mask 850 illustrated in FIGS. 8 and 9.

FIG. 10 is a view for explaining a structure of the mask pattern 855 formed on the mask 850 illustrated in FIGS. 8 and 9.

Referring to FIG. 10, the mask pattern 855 may have a plurality of openings 855h. The plurality of openings 855h may be formed in the mask pattern 855 in the horizontal direction and the vertical direction. Each of the plurality of openings 855h may have, but not limited to, a quadrangular shape. In this case, a first interval x between the plurality of openings formed in the horizontal direction is different from a second interval y between the plurality of openings formed in the vertical direction. Specifically, the first interval x is smaller than the second interval y.

The micro lens array 150 having the plurality of micro lenses 155 illustrated in FIGS. 4 to 6 may be formed by using the mask 850 having the mask pattern 855 illustrated in FIG. 10. The details will be described with reference to FIGS. 7A to 7C, 8, and 11.

Figure 11A:
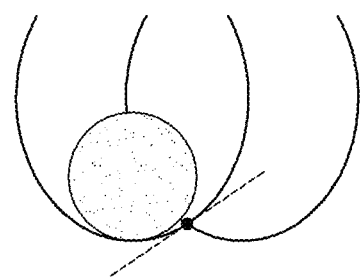
FIGS. 11A and 11B are views for explaining shapes of formed cavities.
Figure 11B:
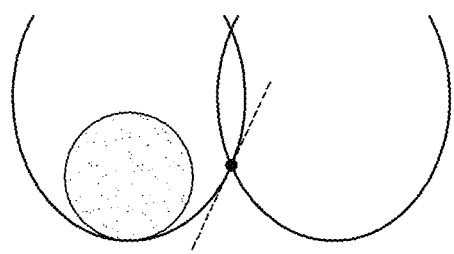

When the first interval x is smaller than the second interval y in the mask 850 illustrated in FIG. 10, the shape of the plurality of voids 835 formed in the photoresist layer 830 varies depending on the horizontal direction and the vertical direction of the photoresist layer 830, as illustrated in FIG. 8A. For example, since the first interval x is relatively smaller than the second interval y, the shape of the two voids 835 disposed adjacent to each other in the vertical direction is illustrated in FIG. 11A, and the shape of the two voids 835 disposed adjacent to each other in the horizontal direction is illustrated in FIG. 11B.

When the processes illustrated in FIGS. 8B to 8C are performed in this state, the formed diffuser 100 has the shape of the diffuser 100 illustrated in FIGS. 4 to 6. As illustrated in FIG. 2, the manufactured diffuser 100 may form, on a particular irradiation surface, the asymmetric light output pattern having the horizontal width and the vertical width which are different from each other.

As described above, the diffuser 100 having the asymmetric light output pattern may be manufactured by adjusting the plurality of openings 855h formed on the mask pattern 855 of the mask 850 so that the horizontal interval between the plurality of openings 855h and the vertical interval between the plurality of openings 855h are different from each other.

Figure 12:
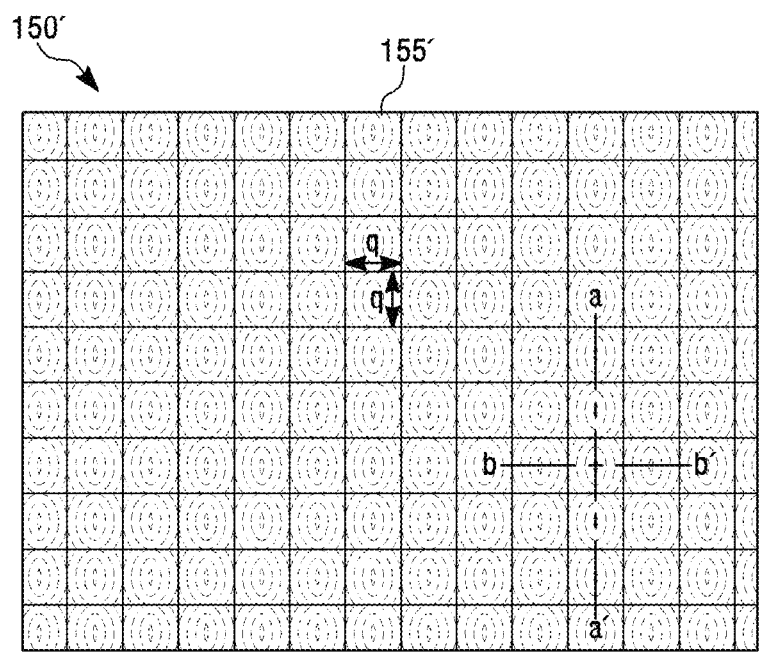
FIG. 12 is a front view illustrating a part of a micro lens array 150' of a diffuser according to a modified exemplary embodiment of the diffuser 100 illustrated in FIG. 1A.

FIG. 12 is a front view illustrating a part of a micro lens array 150' of a diffuser according to a modified exemplary embodiment of the diffuser 100 illustrated in FIG. 1A.

As illustrated in FIG. 12, the diffuser according to another exemplary embodiment of the present invention includes a base (not illustrated) and the micro lens array 150' formed on one surface of the base (not illustrated). The micro lens array 150' includes a plurality of micro lenses 155'. The plurality of micro lenses 155' is disposed adjacent to each other in the horizontal direction and the vertical direction. The plurality of micro lenses 155' may be disposed regularly instead of being disposed randomly.

Each of the micro lenses 155' is a micro lens including a lower surface and a curved surface disposed on the lower surface, and the lower surface has a horizontal length q and a vertical length q which are equal to each other.

Figure 13A:
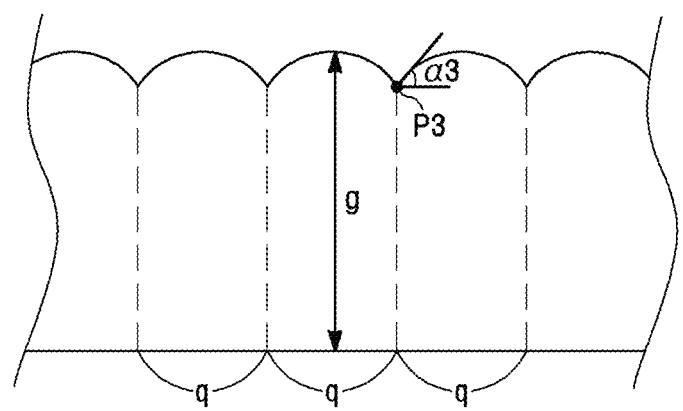
FIG. 13A is a cross-sectional view taken along line a-a' illustrated in FIG. 12.
Figure 13B:
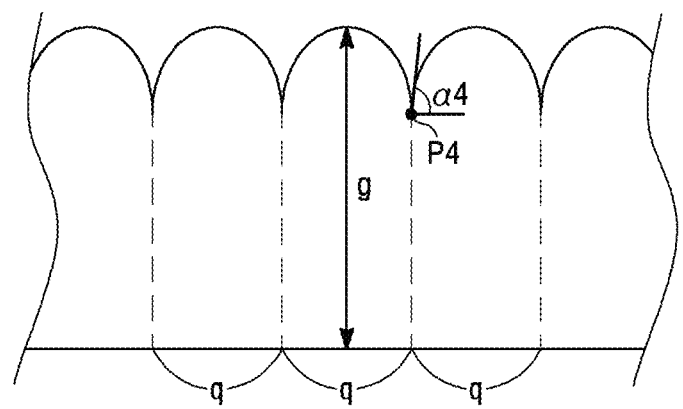

Unlike the lens 155 illustrated in FIG. 5, the curved surface of the micro lens 155' may be a curved surface, of which curvatures in the horizontal and vertical directions are different from each other. More specifically, a curvature of the curved surface of the micro lens 155', which is made by cutting the micro lens 155' in the vertical direction (along the line a-a') as illustrated in FIG. 13A, is different from a curvature of the curved surface of the micro lens 155' which is made by cutting the micro lens 155' in the horizontal direction (along the line b-b') as illustrated in FIG. 13B. Therefore, the micro lens 155' is anisotropic. Meanwhile, although not illustrated in the drawings, the curved surface of the micro lens 155' may be aspherical.

The plurality of micro lenses 155' is disposed adjacent to one another in the horizontal direction and the vertical direction, and the lower surface of each of the plurality of micro lenses 155' has horizontal and vertical lengths equal to each other. Therefore, as illustrated in FIGS. 13A and 13B, in the plurality of micro lenses 155', a gradient α3 of a tangential line at a connection point P3 between the two micro lenses disposed adjacent to each other in the vertical direction is different from a gradient α4 of a tangential line at a connection point P4 between the two micro lenses disposed adjacent to each other in the vertical direction. In more detail, α4 is larger than α3. Meanwhile, in FIGS. 13A and 13B, α3 and α4 may be defined as gradients of the respective tangential lines based on the lower surface of the micro lens 155'.

The spread of the laser beams diffused by the micro lenses 155' is determined based on the different α3 and α4. Specifically, as described above with reference to FIGS. 7A to 7C, the spread of the laser beams is larger as the gradient of the tangential line is relatively steeper (or larger), and the spread of the laser beams is smaller as the gradient of the tangential line is relatively gentler (or smaller). That is, a beam angle or a radiation angle varies depending on an angle of inclination of the curved surface of the micro lens 155'.

As illustrated in FIGS. 13A and 13B, because α4 is relatively larger than α3, the laser beams spread further in the horizontal direction than in the vertical direction. Therefore, as illustrated in FIGS. 2 to 3, the micro lens array 150' having the plurality of micro lenses 155' may emit the laser beams DL that form an asymmetric light output pattern on a particular irradiation surface.

Figures 14A, 14B:
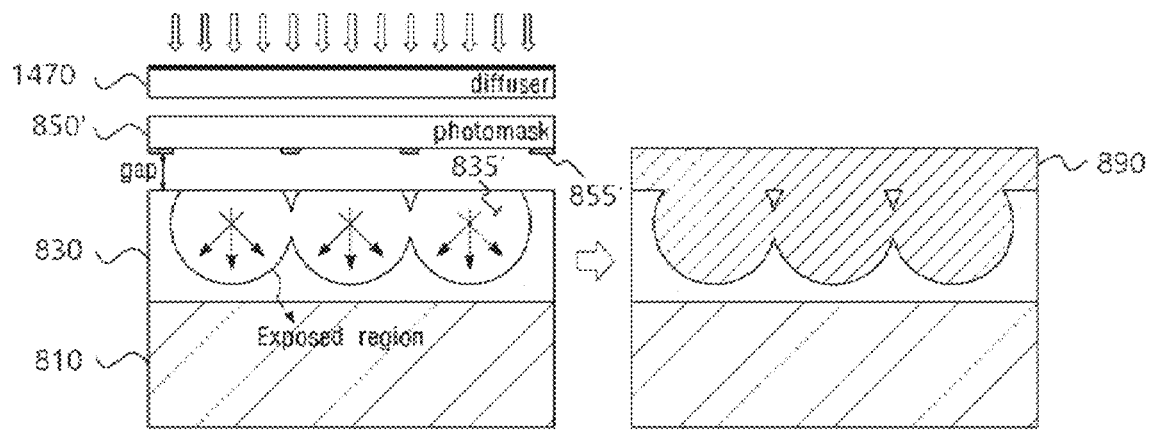
FIGS. 14A to 14C are views for explaining a method of manufacturing a diffuser 100' illustrated in FIG. 13.
Figure 14C:
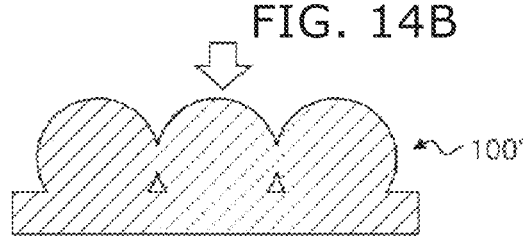

FIGS. 14A to 14C are views for explaining a method of manufacturing the diffuser 100' illustrated in FIG. 13.

Referring to FIG. 14A, the photoresist layer 830 is formed on the substrate 810 (photoresist layer forming step), and a mask 850' having a mask pattern 855' is formed on the photoresist layer 830 (mask forming step). Further, the mask 855' is irradiated with predetermined light such as ultraviolet (UV) rays, such that a plurality of voids 835' corresponding to the mask pattern 855' is formed in the photoresist layer 830 (void forming step).

In this case, the light emitted to the mask 855' may have a horizontal beam angle and a vertical beam angle which are different from each other.

A shape of the plurality of voids 835' may be adjusted based on one or more of an exposure dose of ultraviolet rays, a gap between the mask 855' and the photoresist layer 830 (or between the mask pattern 855' and the photoresist layer 830), and an opening width of the pattern array 855'.

A diffusing plate 1470 (or a diffuser) may be disposed on the mask 850', and then the diffused light (ultraviolet rays) may be emitted to the mask 850'. The diffusing plate 1470 emits the diffused light having the horizontal beam angle and the vertical beam angle which are different from each other. In this case, the shape of the plurality of voids 835' may be additionally adjusted based on types of diffusing plates 1470.

In this case, the diffusing plate 1470 may be a diffuser 1470 that forms an asymmetric light output pattern on a particular irradiation surface by receiving the incident ultraviolet rays. For example, the diffuser 100 illustrated in FIG. 5 or 12 may be used as the diffusing plate 1470. In the case in which the diffuser 100 illustrated in FIG. 5 or 12 is used as the diffusing plate 1470, the asymmetric light output pattern may be projected onto the mask 850' from the diffusing plate 1470.

Referring to FIG. 14B, the diffuser 100' illustrated in FIG. 12 may be formed by forming the diffuser forming material 890 in the plurality of voids 835', curing the diffuser forming material 890, and then separating the cured diffuser forming material 890 from the photoresist layer 830, as illustrated in FIG. 14C (diffuser forming step).

Meanwhile, although not illustrated in the separate drawings, the processes illustrated in FIGS. 9A to 9F may also be applied to form the diffuser illustrated in FIG. 12.

According to the method of manufacturing the diffuser 100' illustrated in FIG. 14C, the mask 850' having the mask pattern 855' is used to manufacture the anisotropic micro lenses 155' illustrated in FIGS. 12 and 13. Hereinafter, the shape of the mask pattern 855' formed on the mask 850' will be described with reference to FIG. 15.

Figure 15:
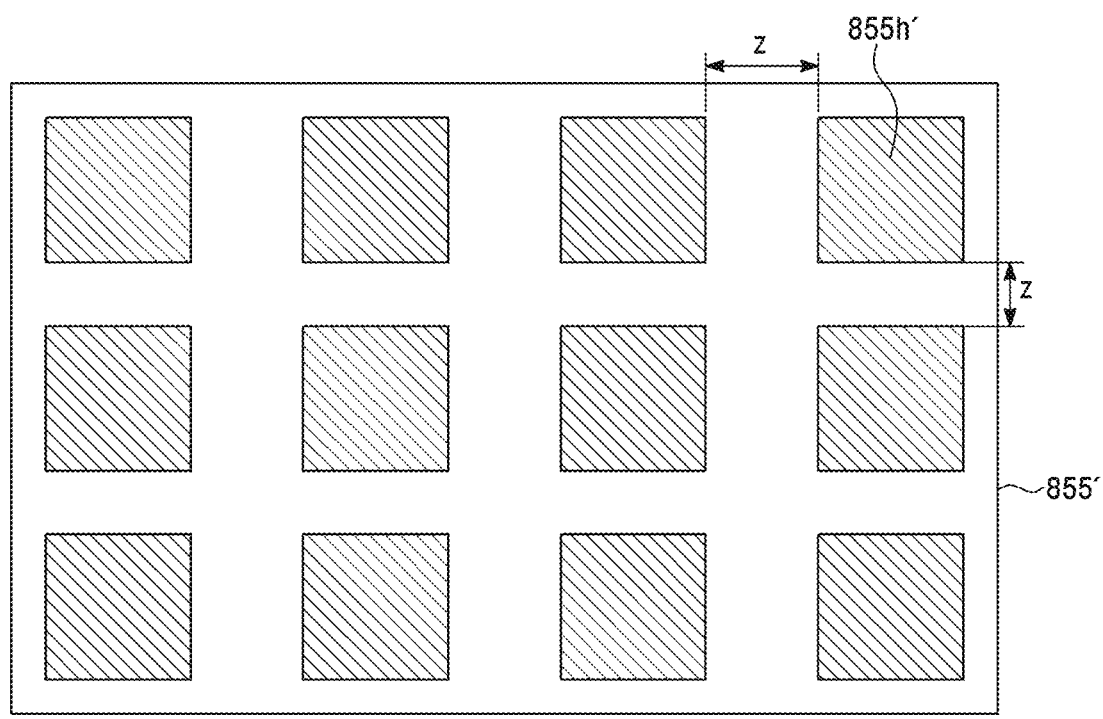
FIG. 15 is a view for explaining a structure of a mask pattern 855' formed on a mask 850' illustrated in FIG. 14.

FIG. 15 is a view for explaining a structure of the mask pattern 855' formed on the mask 850' illustrated in FIG. 14.

Referring to FIG. 15, the mask pattern 855' may have a plurality of openings 855h'. The plurality of openings 855h' may be formed in the mask pattern 855' in the horizontal direction and the vertical direction. Each of the plurality of openings 855h' may have, but not limited to, a quadrangular shape. In this case, an interval z between the plurality of openings formed in the horizontal direction is equal to an interval z between the plurality of openings formed in the vertical direction.

The micro lens array 150' having the plurality of micro lenses 155' illustrated in FIGS. 12 and 13 may be formed by using the mask 850' having the mask pattern 855' illustrated in FIG. 15. The details will be described with reference to FIGS. 14A to 14C and 15.

The first interval z and the second interval z are equal to each other in the mask 850' illustrated in FIG. 15, but the light output pattern of the ultraviolet rays emitted to the photoresist layer 830 is an asymmetric light output pattern. Therefore, a curvature of the plurality of voids 835' formed in the photoresist layer 830 varies depending on the horizontal direction and the vertical direction of the photoresist layer 830, as illustrated in FIG. 14A. For example, a curvature of the curved surface made by cutting the void 835' in the vertical direction is different from a curvature of the curved surface made by cutting the void 835' in the horizontal direction.

When the processes illustrated in FIGS. 14B to 14C are performed in this state, the formed diffuser 100' has the shape of the diffuser 100' illustrated in FIGS. 12 and 13. As illustrated in FIG. 2, the manufactured diffuser 100' may form, on a particular irradiation surface, the asymmetric light output pattern having the horizontal width and the vertical width which are different from each other.

As described above, the horizontal beam angle and the vertical beam angle of the diffused ultraviolet rays emitted to the mask 850' are different from each other even though the horizontal interval between the plurality of openings 855h formed on the mask pattern 855' of the mask 850' is equal to the vertical interval between the plurality of openings 855h. Therefore, it is possible to manufacture the diffuser 100' having an asymmetric light output pattern illustrated in FIGS. 12 and 13. In particular, the diffuser 100' having an asymmetric light output pattern illustrated in FIGS. 12 and 13 may be manufactured by using the diffusing plate 1470 as the diffuser 100 according to the exemplary embodiment illustrated in FIGS. 4 and 5.

The features, structures, effects, and the like described above in the exemplary embodiments are included in one exemplary embodiment of the present invention, but the present invention is not necessarily limited to one exemplary embodiment. Furthermore, the features, structures, effects, and the like described in the respective exemplary embodiments may be combined or modified and then carried out by those skilled in the art as other exemplary embodiments. It should be interpreted that the combination and modification are included in the scope of the present invention.

The exemplary embodiments have been described above, but the exemplary embodiments are just illustrative and not intended to limit the present invention. It can be appreciated by those skilled in the art that various modifications and alterations, which are not described above, may be made without departing from the intrinsic features of the present invention. For example, the respective constituent elements specifically described in the exemplary embodiments may be modified and then carried out. Further, it should be interpreted that the differences related to the modifications and alterations are included in the scope of the present invention defined by the appended claims.

What is claimed is:

1. A diffuser that forms an asymmetric light output pattern by diffusing laser beams received from a laser source, the diffuser comprising:
    a base; and
    a micro lens array disposed on the base, wherein the micro lens array has a plurality of micro lenses each comprising a lower surface and a curved surface disposed on the lower surface, and the lower surface has horizontal and vertical lengths different from each other, and
    wherein a curvature made by cutting the curved surface in a horizontal direction is equal to a curvature made by cutting the curved surface in a vertical direction,
    wherein the plurality of micro lenses is disposed adjacent to one another in a horizontal direction and a vertical direction and arranged regularly, and
    wherein a gradient of a tangential line at a first connection point between the two micro lenses disposed adjacent to each other in the horizontal direction is different from a gradient of a tangential line at a second connection point between the two micro lenses disposed adjacent to each other in the vertical direction.

2. The diffuser of claim 1, wherein the asymmetric light output pattern is a quadrangular pattern having horizontal and vertical widths different from each other.

3. The diffuser of claim 1, wherein the base and the micro lens array are made of the same material.

4. The diffuser of claim 1, wherein the base and the micro lens array are made of different materials.

5. The diffuser of claim 1, further comprising:
    an additional base disposed under the base.

6. A method of manufacturing a diffuser that forms an asymmetric light output pattern by diffusing laser beams received from a laser source, the method comprising:
    a photoresist layer forming step of forming a photoresist layer on a substrate;
    a mask forming step of forming a mask having a predetermined mask pattern on the photoresist layer;
    a void forming step of forming a plurality of voids, which corresponds to the mask pattern, in the photoresist layer by irradiating the mask with the diffused light having horizontal and vertical beam angles equal to each other; and a diffuser forming step of forming the diffuser by forming a diffuser forming material in the plurality of voids, wherein in the mask pattern formed on the mask, a distance between the adjacent two patterns arranged in the horizontal direction is different from a distance between the adjacent two patterns arranged in the vertical direction, and wherein among the plurality of voids formed in the void forming step, a curvature of the two voids disposed adjacent to each other in the horizontal direction is equal to a curvature of the two voids disposed adjacent to each other in the vertical direction, wherein the plurality of voids are disposed adjacent to one another in a horizontal direction and a vertical direction and arranged regularly, and wherein a gradient of a tangential line at a connection point between the two voids disposed adjacent to each other in the horizontal direction is different from a gradient of a tangential line at a connection point between the two voids disposed adjacent to each other in the vertical direction.

7. The method of claim 6, further comprising:

a mold forming step between the void forming step and the diffuser forming step, wherein the mold forming step comprises:

a first mold forming step of forming a first mold by forming the first mold forming material in the plurality of voids; and a second mold forming step of forming a second mold by forming, on the first mold, a second mold forming material different from the first mold forming material, and wherein the diffuser forming step forms the diffuser by forming the diffuser forming material on the second mold.

8. The method of claim 6, wherein the void forming step adjusts a shape of the plurality of voids by adjusting exposure to ultraviolet rays.

9. The method of claim 6, wherein the void forming step adjusts a shape of the plurality of voids by adjusting a distance between the mask and the photoresist layer.

10. The method of claim 6, wherein the void forming step adjusts a shape of the plurality of voids by adjusting a diameter or a width of the mask pattern of the mask.

11. A method of manufacturing a diffuser that forms an asymmetric light output pattern by diffusing laser beams received from a laser source, the method comprising:

a photoresist layer forming step of forming a photoresist layer on a substrate;

a mask forming step of forming a mask having a predetermined mask pattern on the photoresist layer;

a void forming step of forming a plurality of voids, which corresponds to the mask pattern, in the photoresist layer by irradiating the mask with the diffused light having horizontal and vertical beam angles different from each other; and a diffuser forming step of forming the diffuser by forming a diffuser forming material in the plurality of voids, wherein in the mask pattern formed on the mask, a distance between the adjacent two patterns arranged in the horizontal direction is equal to a distance between the adjacent two patterns arranged in the vertical direction, wherein among the plurality of voids formed in the void forming step, a curvature of the two voids disposed adjacent to each other in the horizontal direction is different from a curvature of the two voids disposed adjacent to each other in the vertical direction, wherein the plurality of voids are disposed adjacent to one another in a horizontal direction and a vertical direction and arranged regularly, and wherein a gradient of a tangential line at a connection point between the two voids disposed adjacent to each other in the horizontal direction is different from a gradient of a tangential line at a connection point between the two voids disposed adjacent to each other in the vertical direction.

12. The method of claim 11, further comprising:

a mold forming step between the void forming step and the diffuser forming step, wherein the mold forming step comprises:

a first mold forming step of forming a first mold by forming the first mold forming material on the photoresist layer having the plurality of voids; and a second mold forming step of forming a second mold by forming, on the first mold, a second mold forming material different from the first mold forming material, and wherein the diffuser forming step forms the diffuser by forming the diffuser forming material on the second mold.

13. The method of claim 11, wherein the void forming step comprises a step of disposing a diffusing plate for emitting the diffused light onto the mask, the diffusing plate comprises a base and a micro lens array disposed on the base, the micro lens array has a plurality of micro lenses each comprising lower surface and a curved surface disposed on the lower surface, and the lower surface has horizontal and vertical lengths different from each other.

14. The method of claim 11, wherein the void forming step comprises a step of disposing a diffusing plate for emitting the diffused light onto the mask, the diffusing plate comprises a base and a micro lens array disposed on the base, the micro lens array has a plurality of micro lenses each comprising lower surface and a curved surface disposed on the lower surface, and the lower surface has horizontal and vertical lengths equal to each other.

* * * * *